(12) United States Patent
Mardmoeller et al.

(10) Patent No.: US 9,979,620 B2
(45) Date of Patent: May 22, 2018

(54) COMMUNICATION CONTROLLER

(71) Applicant: RENESAS ELECTRONICS EUROPE LIMITED, Bourne End Buckinghamshire (GB)

(72) Inventors: Christian Mardmoeller, Wuppertal (DE); Thorsten Hoffleit, Essen (DE)

(73) Assignee: RENESAS ELECTRONICS EUROPE LIMITED, Bourne End, Buckinghamshire ( * ) Notice: Subject to any disclaimer, the term of this patent is extended or adjusted under 35 U.S.C. 154(b) by 0 days. days.

(21) Appl. No.: 14/409,038

(22) PCT Filed: Jun. 17, 2013

(86) PCT No.: PCT/EP2013/062548
§ 371 (c)(1),
(2) Date: Dec. 18, 2014

(87) PCT Pub. No.: WO2013/189897
PCT Pub. Date: Dec. 27, 2013

(65) Prior Publication Data
US 2015/0304192 A1 Oct. 22, 2015

(30) Foreign Application Priority Data

Jun. 18, 2012 (EP) ..................................... 12172462

(51) Int. Cl.
*H04L 12/26* (2006.01)
*H04L 12/40* (2006.01)
*H04L 12/939* (2013.01)

(52) U.S. Cl.
CPC .... *H04L 43/0847* (2013.01); *H04L 12/40176* (2013.01); *H04L 12/40182* (2013.01); *H04L 49/552* (2013.01); *H04L 2012/40241* (2013.01)

(58) Field of Classification Search
USPC ....... 370/216, 217, 218, 222, 223, 225, 228, 370/249
See application file for complete search history.

(56) References Cited

U.S. PATENT DOCUMENTS 7,778,159 B2 * 8/2010 Driscoll .................. H04L 12/42
370/217
2002/0160782 A1 * 10/2002 Joshi ...................... H04W 28/22
455/452.1

(Continued)

FOREIGN PATENT DOCUMENTS

CN          1993935 A       7/2007
JP          S59181860       10/1984
(Continued)

OTHER PUBLICATIONS

European Patent Office extended Search Report dated Aug. 3, 2012.
(Continued)

*Primary Examiner* — Kwang B Yao
*Assistant Examiner* — Nguyen Ngo
(74) *Attorney, Agent, or Firm* — NK Patent Law, PLLC (57) ABSTRACT

A communication controller is described. The communication controller can exchange data on first and second communications channels (A, B). In a first mode, data transmitted on the first communication channel cannot be decoded on the second communication channel. In a second mode, data transmitted on the first communication channel is decodable on the second communication channel so as to provide loop back functionality.

13 Claims, 7 Drawing Sheets

(56) References Cited

U.S. PATENT DOCUMENTS

| | | | |
|---|---|---|---|
| 2004/0081079 A1 | 4/2004 | Forest | |
| 2005/0132105 A1* | 6/2005 | Hall | G06F 11/1625 710/36 |
| 2007/0179733 A1* | 8/2007 | Clark | G01R 31/31717 702/122 |
| 2008/0163018 A1* | 7/2008 | Seo | G06F 11/263 714/726 |
| 2008/0228237 A1* | 9/2008 | Bange | A61N 1/37252 607/32 |
| 2009/0125592 A1 | 5/2009 | Hartwich et al. | |
| 2010/0008456 A1* | 1/2010 | Rohatschek | H04L 25/08 375/354 |
| 2010/0083070 A1* | 4/2010 | Xiang | H03M 13/2909 714/752 |
| 2010/0103042 A1* | 4/2010 | Bishop | G01S 5/0231 455/404.1 |
| 2010/0188972 A1* | 7/2010 | Knapp | H04L 12/43 370/226 |
| 2010/0192051 A1* | 7/2010 | Kabulepa | H04L 1/0061 714/807 |
| 2011/0026411 A1* | 2/2011 | Hao | H04L 12/40189 370/249 |
| 2011/0191659 A1* | 8/2011 | Fuhrmann | H04L 12/40006 714/807 |
| 2012/0278540 A1* | 11/2012 | Lin | G06F 12/0246 711/103 |
| 2013/0219491 A1* | 8/2013 | Hall | H04L 45/22 726/22 |

FOREIGN PATENT DOCUMENTS

| | | |
|---|---|---|
| JP | H01280852 A | 11/1989 |
| JP | S62256550 A | 11/1989 |

OTHER PUBLICATIONS

PCT Search Report and Opinion of the International Searching Authority dated Jul. 29, 2013.

Haixu Liu, "Design and Implementation of ARINC 659 Communication Bus", China Master's Theses Full-text Database (Electronic Journal), Information Technology, Dec. 1, 2010.

JPO, Office Action for Japanese Patent Application No. 2015-517715 dated May 9, 2017.

SIPO, First Office Action for Chinese Patent Application No. 201380032174.X, dated Apr. 1, 2017.

* cited by examiner

COMMUNICATION CONTROLLER

CROSS REFERENCE TO RELATED APPLICATIONS

This application is a 37 C.F.R. § 371 national phase application of International Patent Application No. PCT/EP2013/062548, filed on Jun. 17, 2013, which claims the benefit of EP Patent Application No. 12172462.9, filed Jun. 18, 2012, the disclosures of which are incorporated herein by reference in their entireties.

FIELD OF THE INVENTION

The present invention relates to a communication controller, such as a FlexRay communication controller.

BACKGROUND

FlexRay is a communication protocol for use in automotive applications. It specifies a scalable, high-speed (up to 10 Mbit/s), deterministic and fault-tolerant communication system in which nodes (or "electronic control units") can exchange data over a serial bus network via two independent communication channels.

Each FlexRay node includes a communication controller and a physical interface converter. The communication controller handles the interface with a host (in the form of a central processing unit which executes application software) and carries out serial data stream format conversion. The physical interface converter adapts the serial data stream to the requirements of the physical link.

The communication controller includes two main data paths, namely a transmit path and a receive path. The transmit path provides functions for encoding data provided by the host and passing the encoded data to the physical interface converter for transmission. The receive path provides functions for decoding data received by physical interface converter and passing the decoded data to the host.

Safety-related applications require checks be carried out to ensure that all the parts of the node, including the interface to the serial bus, are operating correctly. These checks can be performed during power-on, i.e. before normal operation of the node begins, or during normal operation. Performing checks before normal operation begins is referred to herein as "power-on checking" and performing checks during normal operation is referred to herein as "monitoring".

Power-on checking seeks to test maximum functional coverage (i.e. to test the widest range of functions) based on test conditions which are as close as possible to those conditions found during normal operation. Such checks should ideally be invisible to other nodes, i.e. the checks preferably should not result in the node transmitting data to other nodes.

A loop-back function can be used for power-on checking of a serial interface. Ideally, data generated in the transmit path of a communication controller should be routed inside the node to the receive path of the same communication controller. In this situation, transmit and receive paths are referred to as "data source" and "data sink" respectively. However, the use of loop-back function in FlexRay is limited.

FlexRay is a half-duplex communication protocol. Thus, existing FlexRay communication controllers cannot pass data to the physical interface converter on one channel and receive the data from the physical interface converter on the same channel. Therefore, loop-back for power-on checking via the physical layer converter cannot be implemented by simply connecting transmit and receive paths.

Notwithstanding this, it is possible to provide special loop-back logic inside the communication controller and thus provide a degree of loop-back. However, the extent of the path checked by the loop-back function is limited. For example, loop-back does not cover part of the communication controller and does not cover the connection to the physical interface converter.

As mentioned earlier, FlexRay allows nodes to exchange data over two communication channels. However, a FlexRay communication controller cannot transmit data on one channel and extract the data on the other channel.

One way to provide loop-back functionality is to provide a second communication controller. However, this arrangement still falls short of maximum functional coverage since a different controller is used during power-on checking to the one used during normal operation.

A second communication controller can also be used for monitoring. However, the second communication controller should be carefully configured to ensure not only that it is invisible to other nodes (i.e. it should not transmit data), but also should not detrimentally affect normal functioning of the first communication controller.

SUMMARY

According to a first aspect of the present invention there is provided a communication controller for exchanging data on first and second independent communication channels. In a first mode, data transmitted on the first communication channel cannot be decoded on the second communication channel. In a second mode, data transmitted on the first communication channel is decodable on the second communication channel so as to provide loop back functionality.

The first mode may be a normal mode of operation and the second mode may be a dedicated test mode.

The data may comprise data frames and/or symbols. Each data frame may include a portion which comprises a cyclic redundancy code. The cyclic redundancy codes for the first and second communication channels may generated in dependence upon first and second constants wherein, in the first mode, the first and second constants are different and, in the second, the first and second constants are the same.

According to a second aspect of the present invention there is provided a FlexRay communication controller. In a first mode, data transmitted on a first communication channel cannot be decoded on a second communication channel. In a second mode, data transmitted on the first communication channel is decodable on the second communication channel so as to provide loop back functionality In the first mode, the first communication channel may use a first frame cyclic redundancy code (CRC) initialisation value and the second communication channel may use a second, different frame CRC initialisation value. In the second mode, the first communication channel may use the first frame CRC initialisation value and the second communication channel may use the first frame CRC initialisation value.

The first communication channel may be channel A and the first communication channel may be channel B. The first communication channel may be channel B and the first communication channel may be channel A.

In the first mode, the communication controller may be operable compliant with FlexRay. In the second mode, the communication controller may be operable compliant with FlexRay or non-compliant with FlexRay.

According to a third aspect of the present invention there is provided an integrated circuit comprising the communication controller and physical layer converters for interfacing with a serial bus. The physical layers converter may include bus drivers. The serial bus may be a wire bus.

The integrated circuit may be a microcontroller. The microcontroller may further comprise at least one central processing unit. The microcontroller may further include peripheral modules, such as timers and communication controller(s).

The at least one central processing unit may include a central processing unit configured to switch the communication controller between the first and second modes.

BRIEF DESCRIPTION OF THE DRAWINGS

Certain embodiments of the present invention will now be described, by way of example, with reference to FIGS. 5 to 7 of the accompanying drawings, in which.

DETAILED DESCRIPTION OF CERTAIN EMBODIMENTS

In the following description like parts are denoted by like reference numerals.

Conventional FlexRay Electronic Control Units

Figure 1:
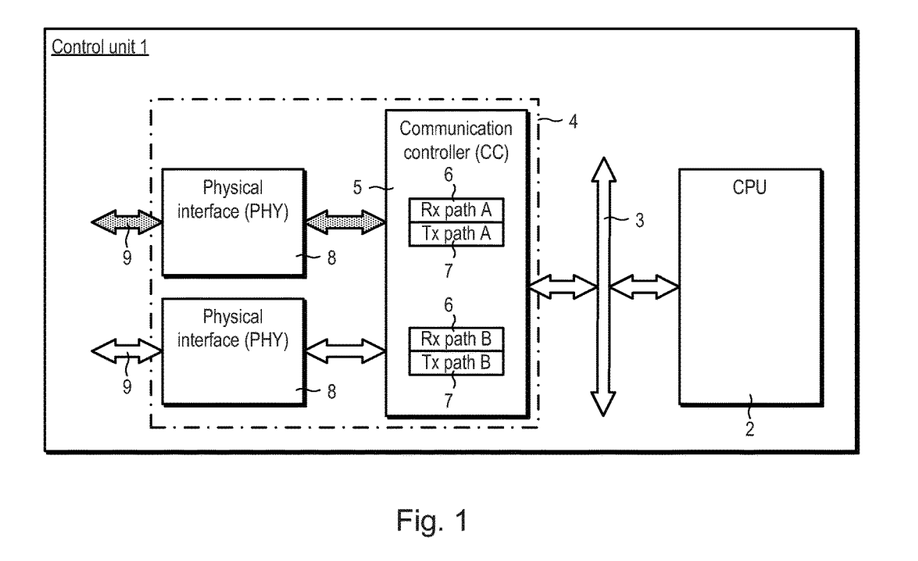
FIG. 1 is a schematic block diagram of a conventional FlexRay electronic control unit which includes a FlexRay communication controller.

Referring to FIG. 1, a conventional FlexRay electronic control unit 1 is shown. The electronic control unit 1 includes a central processing unit 2 and a bus 3 through which the central processing unit 2 can communicate with a serial interface unit 4. The serial interface unit 4 comprises a communication controller 5 which includes first and second channels A, B each comprising a receive path 6 and a transmit path 7, and a physical interface converter 8 layer which drives a serial interface 9.

Figure 2:
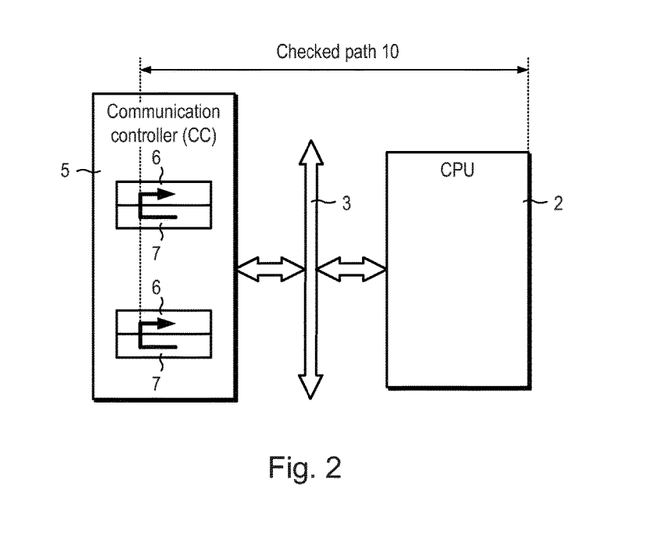
FIG. 2 illustrates a limited form of loop-back in the conventional FlexRay communication controller shown in FIG. 1 and a check path covered by loop-back.

Referring also FIG. 2, the control unit 1 can be provided with loop-back logic (not shown) between receive and transmit paths 6, 7 to allow loop-back. However, as shown in FIG. 2, the logic provides a check path 10 which ends inside the communication controller 5. Thus, a part of the communication controller 5 (as well as the connection to the physical interface converter 8 and the physical interface converter itself) is not covered by the loop-back.

Most FlexRay communication controllers provide two channels, namely Channel A and Channel B. FlexRay allows three modes of channel operation to be configured using the parameter, pChannels, namely pChannels=A: Single channel communication using channel A, pChannels=B: Single channel communication using channel B and pChannels=A&B: Dual channel communication using channel A and B.

Although dual channel operation is permitted, the two channels operate independently of one another such that data sent on one channel cannot be received and decoded on the other. This is occurs through a frame filtering process based on a frame cyclic redundancy code (CRC) in the coding/decoding process.

A frame CRC is calculated using a CRC polynomial, vCrcPolynomial, which is preset (vCrcPolynomial=cCrcPolynomial) and an initialization vector (vCrcInit).

Figure 3:
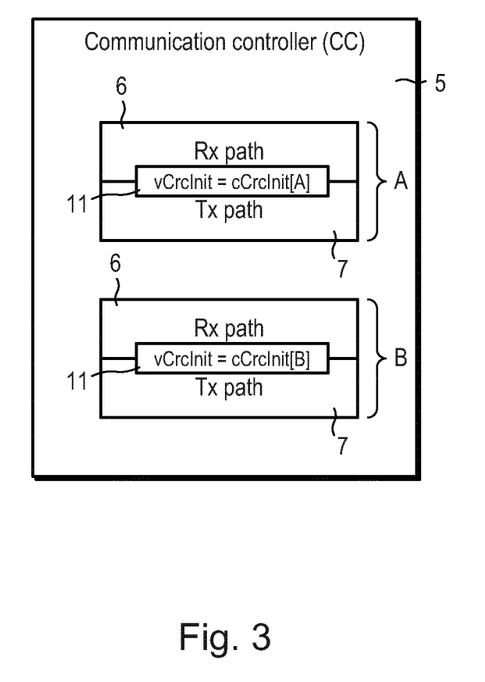
FIG. 3 illustrates first and second cyclic redundancy code (CRC) initialization values being used in coding and decoding in the first and second channels.

As shown in FIG. 3, the initialization vector 11, vCrcInit, for channel A is set to vCrcInit[A]=0xFEDCBA. The initialization vector 11, vCrcInit, for channel B is set to vCrcInit[B]=0xABCDEF.

For safety-related application monitoring, a second FlexRay communication controller is required.

Figure 4:
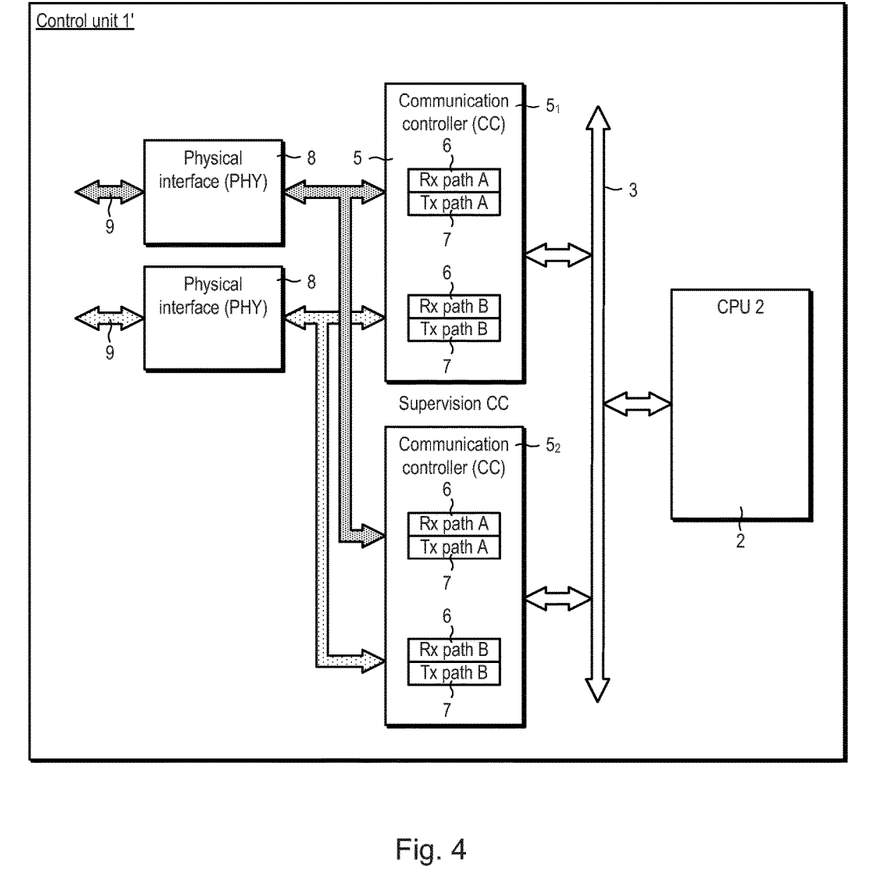
FIG. 4 is a schematic block diagram of a conventional FlexRay electronic control unit which includes first and second FlexRay communication controllers so as to provide two-channel loop-back functionality.

Referring to FIG. 4, another conventional FlexRay electronic control unit 1' is shown. As shown in FIG. 4, the unit 1' includes first and second FlexRay communication controllers $5_1$, $5_2$ each including first and second transmit paths 6 and first and second receive paths 7. As shown in FIG. 4, a second communication controller $5_2$ can be used to supervise both channels of the first communication controller $5_1$. However, the second communication controller $5_2$ can be used to supervise only one single channel, e.g. channel A, of the first communication controller $5_1$.

The second communication controller $5_2$ provides loop-back checking and monitoring coverage in the first channel (i.e. channel A) of the first communication controller $5_1$. The second communication controller $5_2$ provides loop-back checking and monitoring coverage in the second channel (i.e. channel B) of the first communication controller $5_1$.

FlexRay Electronic Control Units

Figure 5:
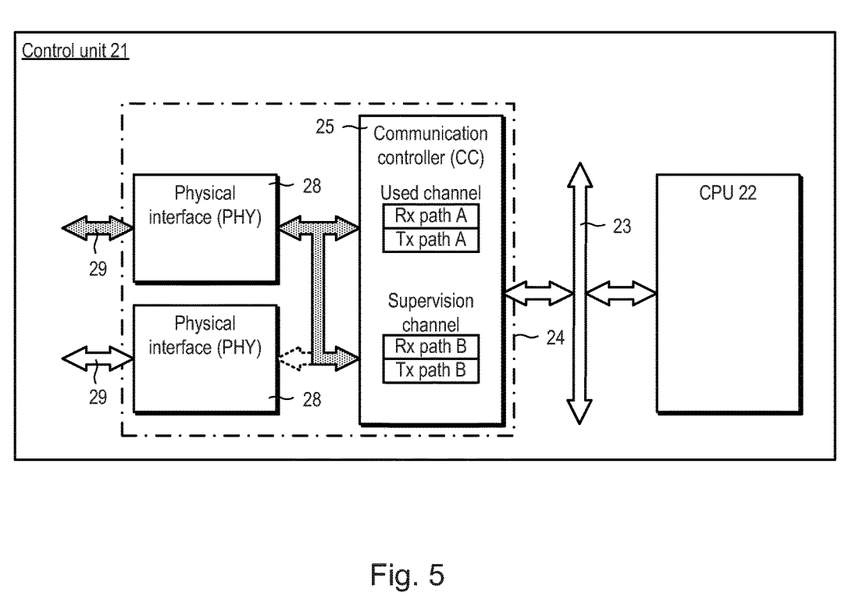
FIG. 5 is a schematic block diagram of a FlexRay electronic control unit which includes a FlexRay communication controller in accordance with the present invention.

Referring to FIG. 5, an embodiment of a FlexRay electronic control unit 21 in accordance with the present invention is shown.

The electronic control unit 1 includes a central processing unit 22 and a bus 23 through which the central processing unit 22 can communicate with a serial interface unit 24. The serial interface unit 24 comprises a communication controller 25 which includes a first and second channels A, B each comprising a receive path 26 and a transmit path 27, and a physical interface converter 28 layer which drives a serial interface 29. The FlexRay electronic control unit 21 includes only one FlexRay communication controller 25.

The communication controller 25 is configured to allow one channel, e.g. channel A, to be used for communication and the other channel, channel B, to be used for supervision, e.g. for monitoring and for loop-back checking. Thus, the need for a second communication controller can be avoided and so reduce the complexity of a FlexRay electronic control unit 21 which is capable of monitoring and loop-back checking functionality.

As explained earlier, FlexRay allows three modes of channel operation, namely pChannels=A, pChannels=B and pChannels=A&B. A supervision function is available by setting when pChannels=A or pChannels=B.

FIG. 5 illustrates the control unit 21 where the communication controller 25 can communicate on Channel A, i.e. Channel A is the used channel, and monitor communication on Channel A using Channel B, i.e. Channel B is the supervisor channel.

Figure 6:
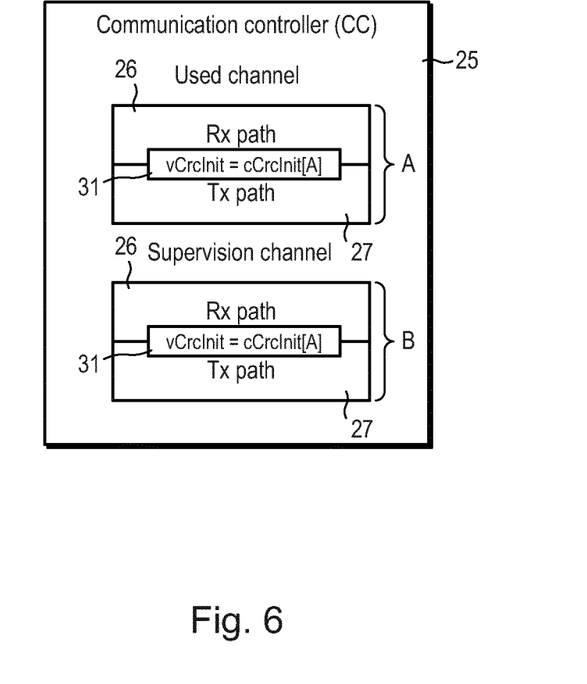
FIG. 6 illustrates the same CRC initialization value being used in coding and decoding in the first and second channels.

Referring also to FIG. 6, when in supervision mode, the supervisor channel uses the same CRC calculation rules, in particular the same initialization vector 31, as the used channel. Thus, the supervisor channel is able to decode all communication on the used channel in a similar way to using a separate dedicated FlexRay communication controller for supervision.

As shown in FIG. 6, the CRC initialization value of channel A is used for both channels. However, the CRC initialization value of channel B can be used for both channels instead.

Figure 7:
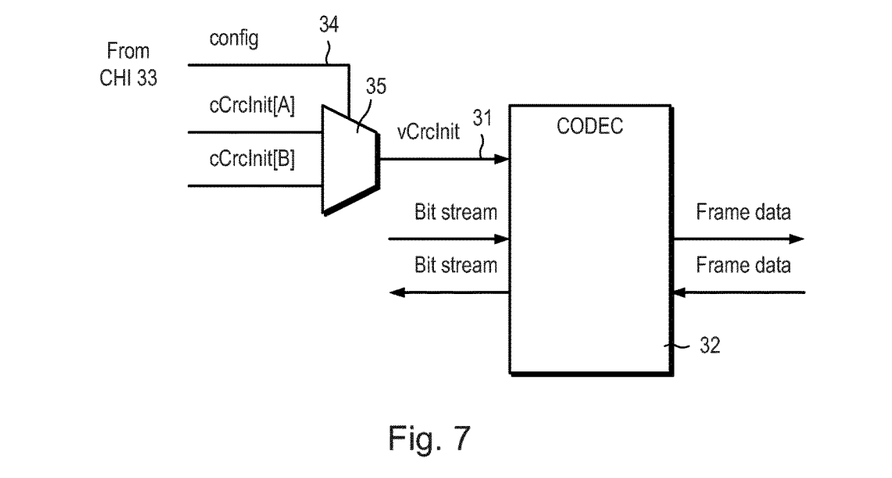
FIG. 7 illustrates a circuit for selecting a CRC initialization value and passing the CRC initialization value to a coder and decoder circuit.
Figure 8:
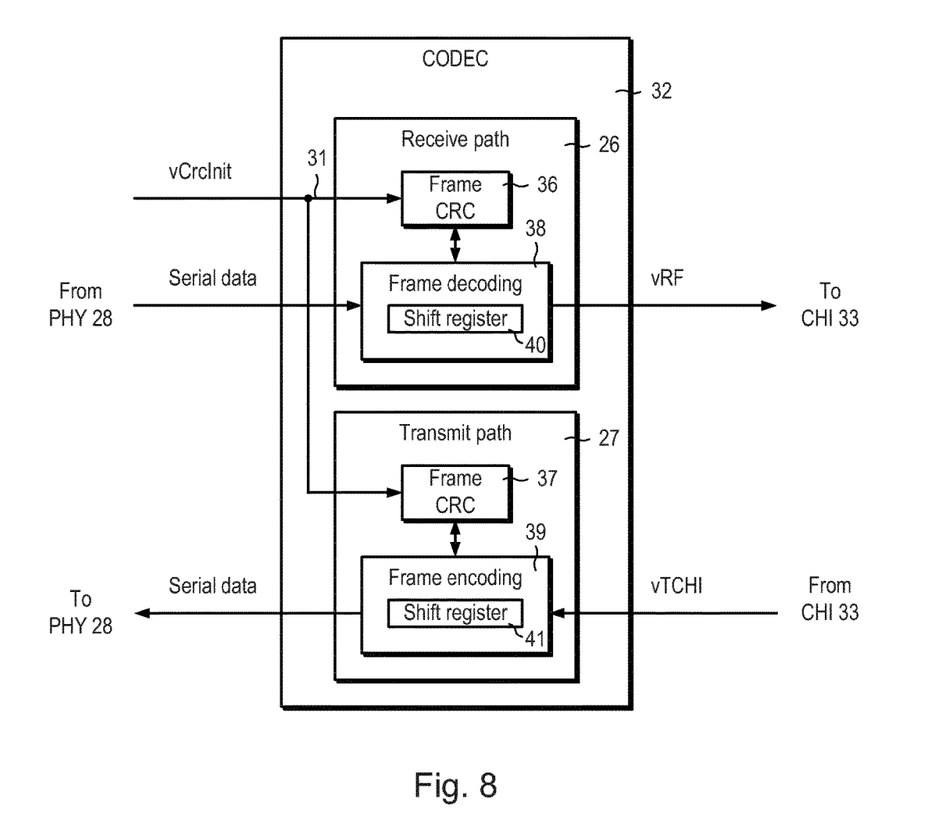
FIG. 8 illustrates the coder and decoder circuit shown in FIG. 7 in more detail.

Referring also to FIGS. 7 and 8, each channel (i.e. channel A and channel B) is provided with a respective coder/decoder 32.

The controller-host interface 33, through respective configuration signals 34, controls switches 35 for selecting the initialization vector 31 provided to each coder/decoder 32.

As shown in FIG. 8, the initialization vector 31 is supplied to frame CRC logic 36, 37 in receive and transmit circuits 26, 27 and controls frame decoding and frame encoding circuits 38, 39 respectively. In the receive path, a CRC shift register 40 is initialized with the vector 31. In the transmit path, a CRC shift register 41 is initialized with the same vector 31. In some embodiments, receive and transmit circuits can share the same CRC logic and shift register, i.e. only one CRC logic circuit and one shift register may be provided which both receive and transmit circuits can access at the same time.

The coder/decoders 32 for both channels use the same initialization value 31 which may be cCrcInit[A] (i.e. 0xFEDCBA) or cCrcInit[B] (i.e. 0xABCDEF). Thus, the coder/decoder 32 used in the supervision channel (e.g. channel A) can decode bit streams transmitted to and received from the physical interface 29 by the coder/decoder 32 of the used channel, e.g. channel B.

Figure 9:
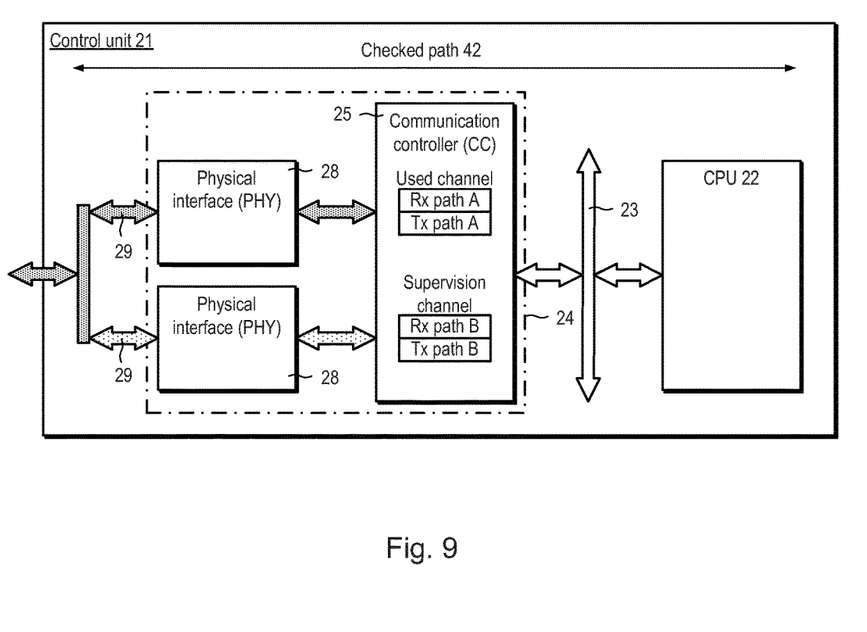
FIG. 9 illustrates a check path for the FlexRay communication controller shown in FIG. 5.

Referring also to FIG. 9, the supervision channel is able monitor FlexRay bus activity (connected at physical layer connector), the transmit path (connected to transmit interface of communication controller 25) and the receive path (connected to receive interface of communication controller 25) over a check path 42. By using an available filter mechanism, the information provided by the supervision channel to the central processing unit 22 can be restricted. Because the supervisor channel has an independent decoder 22 (FIG. 8), the decoded data and the decoding status are same as the receiver of an independent supervision communication controller.

The control unit 21, comprising only one communication controller 22, is able to provide the same test coverage in supervision mode as a control unit comprising two communication controllers.

In certain embodiments, the control unit 21 may be switched into a special test mode to operate outside the FlexRay specification.

In certain embodiments of the present invention, it is possible extend the functionality of the FlexRay communication to provide channel supervision of single channel FlexRay clusters without the need for substantial additional hardware, i.e. an additional communication controller. Safety applications can use the unused channel of the communication controller to supervise the bit stream of the used channel. This can be used in power-on self tests and, optionally, during normal operation.

It will be appreciated that many modifications may be made to the embodiments hereinbefore described.

In some embodiments, the parameter pChannels may be extended to have two additional values, e.g. Asub and Bsub, or a new parameter, may be defined, e.g. pSupervision.

In certain embodiments, the control unit may include another communication controller which is not used for channel supervision.

The invention claimed is:

1. A communication controller for exchanging data on first and second independent communication channels, the communication controller comprising:

a first coder/decoder for the first communications channel; and a second coder/decoder for the second communications channel;

wherein the communication controller is switchable between a first, normal mode of operation and a second, dedicated test mode, wherein the communication controller is configured such that, in the first mode, data transmitted on the first communication channel is encoded such that it is not decodable on the second communication channel, and, in the second mode, data transmitted on the first communication channel is encoded such that it is decodable on the second communication channel so as to provide loop back functionality, wherein the data comprises data frames and each data frame includes a portion which comprises a cyclic redundancy code, and wherein the cyclic redundancy codes for the first and second communication channels are generated in dependence upon first and second constants, wherein, in the first mode, the first and second constants are different and, in the second, the first and second constants are the same, and the first and second constants are provided to the first and second coder/decoders respectively.

2. A communication controller which is a FlexRay communication controller for exchanging data on first and second independent communication channels, the communication controller comprising:

a first coder/decoder for the first communications channel; and a second coder/decoder for the second communications channel;

wherein the communication controller is switchable between a first, normal mode of operation and a second, dedicated test mode, wherein the communication controller is configured such that, in the first mode, data transmitted on the first communication channel is encoded such that it is not decodable on the second communication channel, and, in the second mode, data transmitted on the first communication channel is encoded such that it is decodable on the second communication channel so as to provide loop back functionality, wherein, in the first mode, the first communication channel uses a first frame CRC initialisation value and the second communication channel uses a second, different frame CRC initialisation value and, in the second mode, the first communication channel uses the first frame CRC initialisation value and the second communication channel uses the first frame CRC initialisation value, wherein, in the first mode, the first and second CRC initialization value are provided to the first and second coder/decoders respectively and, in the second mode, the first frame CRC initialization value is provided to the first and second coder/decoder.

3. A communication controller according to claim 2, wherein the first communication channel is channel B and the second communication channel is channel A.

4. A communication controller according to claim 2, wherein, in the first mode, the communication controller is operable compliant with FlexRay.

5. A communication controller according to claim 2, wherein, in the second mode, the communication controller is operable non-compliant with FlexRay.

6. An integrated circuit comprising:
a communication controller for exchanging data on first and second independent communication channels, the communication controller switchable between a first, normal mode of operation and a second, dedicated test mode, the communication controller is configured such that, in the first mode, data transmitted on the first communication channel is encoded such that it is not decodable on the second communication channel, and, in the second mode, data transmitted on the first communication channel is encoded such that it is decodable on the second communication channel so as to provide loop back functionality, wherein the data comprises data frames and each data frame includes a portion which comprises a cyclic redundancy code, and wherein the cyclic redundancy codes for the first and second communication channels are generated in dependence upon first and second constants wherein, in the first mode, the first and second constants are different and, in the second, the first and second constants are the same; and
a physical layer converter for interfacing with a serial bus.

7. An integrated circuit according to claim 6, wherein the serial bus is a wire bus.

8. An integrated circuit according to claim 6, which is a microcontroller, the microcontroller further comprising:
at least one central processing unit.

9. A microcontroller according to claim 8 wherein the least one central processing unit includes a central processing unit configured to switch the communication controller between the first and second modes.

10. An integrated circuit comprising:
A communication controller which is a FlexRay communication controller for exchanging data on first and second independent communication channels, the communication controller switchable between a first, normal mode of operation and a second, dedicated test mode, the communication controller is configured such that, in the first mode, data transmitted on the first communication channel is encoded such that it is not decodable on the second communication channel, and, in the second mode, data transmitted on the first communication channel is encoded such that it is decodable on the second communication channel so as to provide loop back functionality, wherein, in the first mode, the first communication channel uses a first frame CRC initialisation value and the second communication channel uses a second, different frame CRC initialisation value and, in the second mode, the first communication channel uses the first frame CRC initialisation value and the second communication channel uses the first frame CRC initialisation value; and
a physical layer converter for interfacing with a serial bus.

11. An integrated circuit according to claim 10, wherein the serial bus is a wire bus.

12. An integrated circuit according to claim 10, which is a microcontroller, the microcontroller further comprising:
at least one central processing unit.

13. A microcontroller according to claim 12 wherein the least one central processing unit includes a central processing unit configured to switch the communication controller between the first and second modes.

* * * * *